Aug. 7, 1951     J. E. RISSE     2,563,372
VERTICALLY ADJUSTABLE TRAILER

Filed Aug. 19, 1948     3 Sheets-Sheet 1

John E. Risse
INVENTOR.

BY

Aug. 7, 1951 J. E. RISSE 2,563,372
VERTICALLY ADJUSTABLE TRAILER
Filed Aug. 19, 1948 3 Sheets-Sheet 2
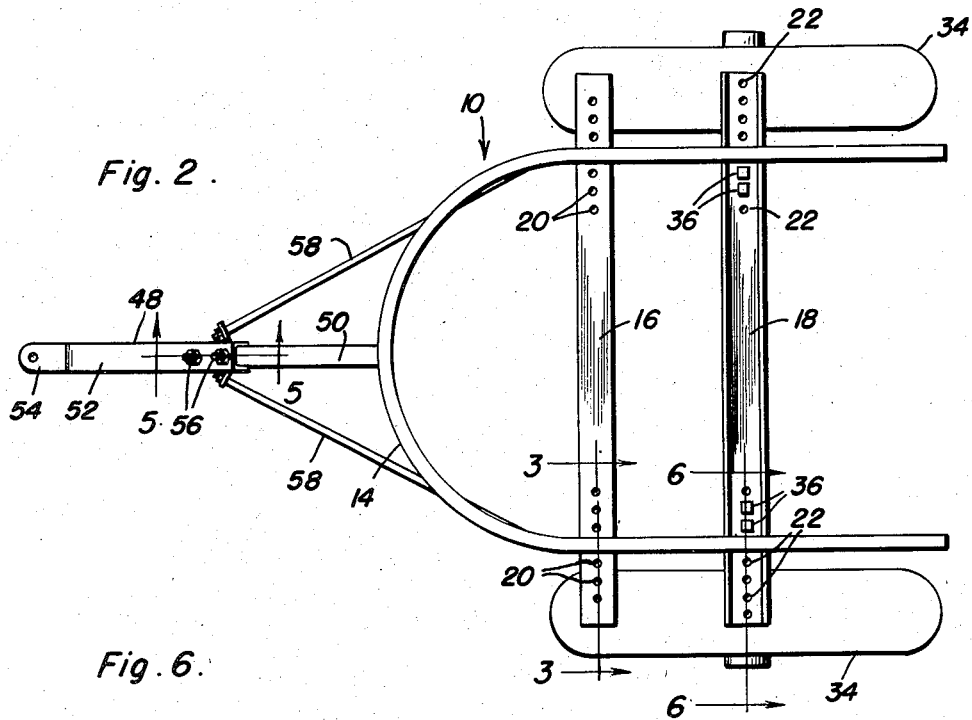
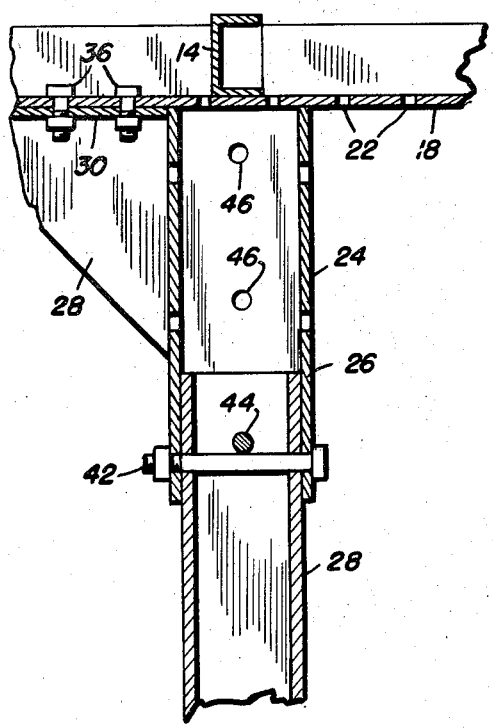
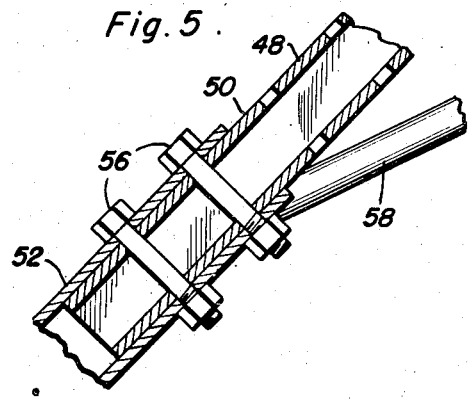
John E. Risse
INVENTOR.

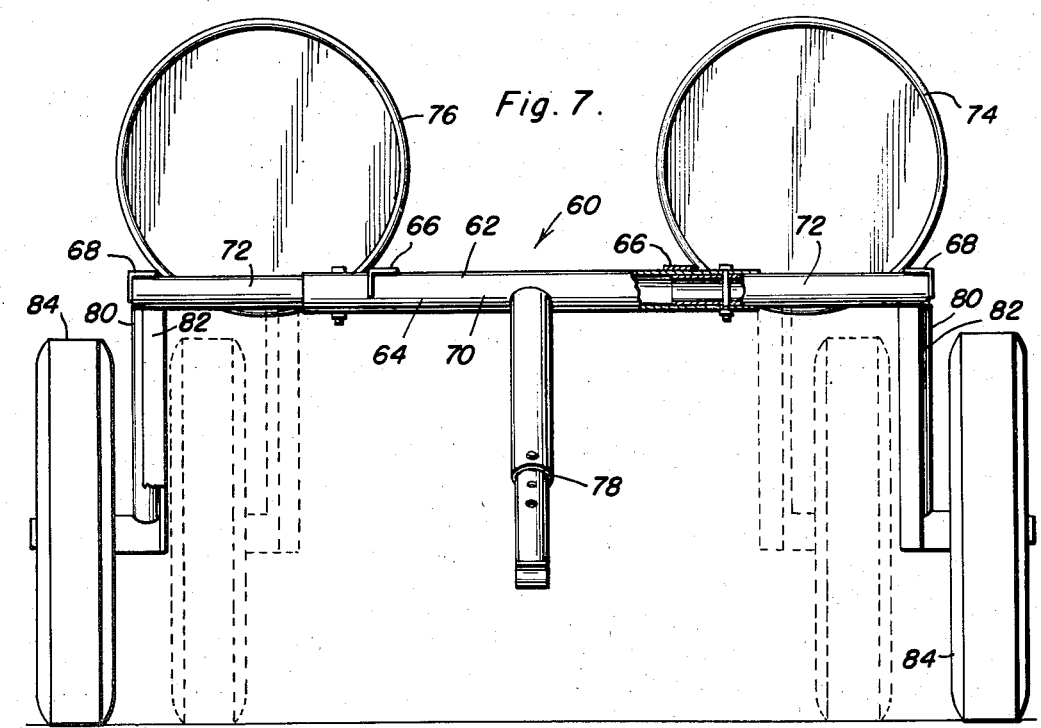
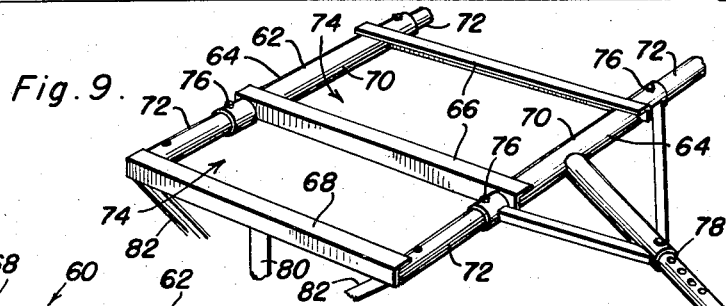
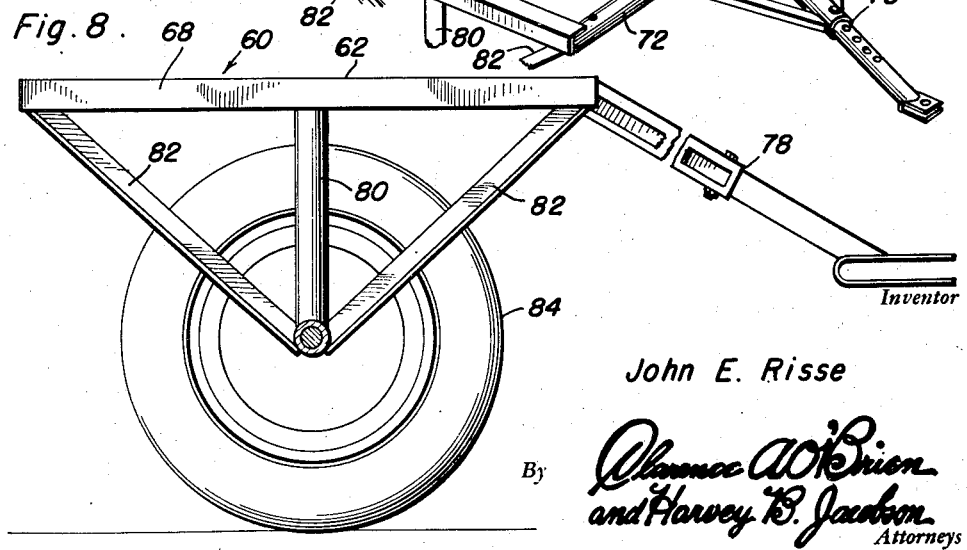

Patented Aug. 7, 1951

2,563,372

UNITED STATES PATENT OFFICE 2,563,372

VERTICALLY ADJUSTABLE TRAILER

John E. Risse, Eldora, Iowa

Application August 19, 1948, Serial No. 45,132

1 Claim. (Cl. 280—43)

This invention relates to new and useful improvements and structural refinements in wagons or trailers, and the principal object of the invention is to facilitate convenient transportation of tanks such as are commonly employed in the distribution of weed exterminators, fertilizers, and the like.

This object is achieved by the provision of a tank carrier or wagon including a draw-bar and a pair of travelling wheels, the latter being mounted on supports extending downwardly from the frame of the carrier, and matters being so arranged that both the draw-bar and the wheel supports are readily adjustable so as to facilitate carrying of the tank at a proper level above the ground.

An important feature of the invention also resides in the provision of means for varying the tread, that is, the distance between the wheels of the carrier.

An additional feature of the invention is to facilitate adjustment of the carrier as to width, in accordance with the number of tanks transported thereon.

One of the advantages of the invention resides in its simplicity but sturdiness of construction, and in its adaptability to economical manufacture.

With the above more important objects and features in view and such other objects and features as may be apparent as this specification proceeds, the invention consists essentially of the arrangement and construction of parts as illustrated in the accompanying drawings, in which:

Figure 2 is a top plan view of the carrier per se;

Figure 5 is a cross sectional view, taken substantially in the plane of the line 5—5 of Figure 2;

Figure 6 is a cross sectional view, taken substantially in the plane of the line 6—6 of Figure 2;

Figure 7 is a front elevational view of a modified embodiment of the invention, showing a plurality of tanks thereon;

Figure 8 is a side elevational view of the device shown in Figure 7, with the tanks removed; and, Figure 9 is a fragmentary perspective view of the frame used in the embodiment shown in Figures 7 and 8.

Like characters of reference are employed to designate like parts in the specification and throughout the several views.

Figure 1:
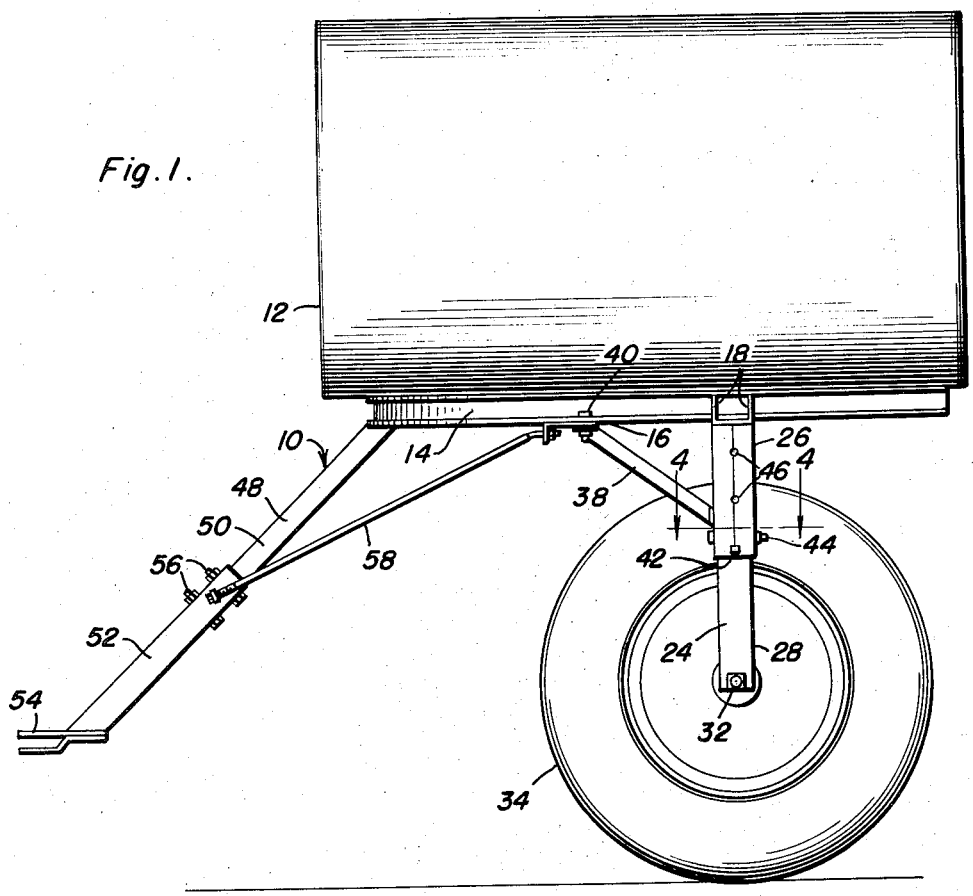
Figure 1 is a side elevational view of the invention together with a tank carried thereon, the near wheel of the carrier being removed for purposes of illustration.

Referring now to the accompanying drawings in detail, the invention consists of a carrier designated generally by means of a reference character 10, such as may be conveniently and effectively employed in association with a tank 12 for transporting and distributing weed exterminators, fertilizers, and the like, the tank 12 being of any conventional type and constituting no component part of the instant invention.

The carrier 10 embodies in its construction a frame including a channel 14 arcuated so as to assume a substantially U-shaped configuration best shown in Figure 2, the arcuate portion of the channel preferably constituting the front of the carrier, as will be clearly apparent.

Figure 3:
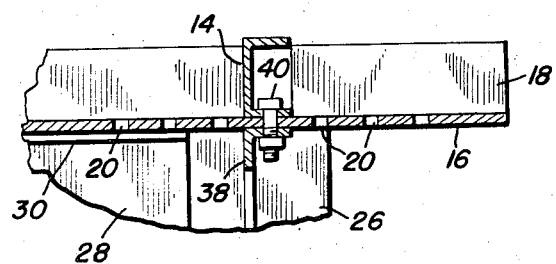
Figure 3 is a cross sectional view, taken substantially in the plane of the line 3—3 of Figure 2.
Figure 4:
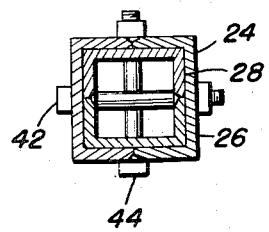
Figure 4 is a cross sectional view, taken substantially in the plane of the line 4—4 of Figure 1.

A pair of spaced parallel cross members 16, 18 are secured by welding, or the like, to intermediate portions of the frame 14, both the cross members being formed in the end portions thereof with rows of apertures 20, 22, respectively, as illustrated in Figures 2, 3 and 6.

Downwardly extending wheel supports 24 are adjustably secured to the cross member 18, each of these wheel supports comprising a pair of slidably telescoped, box-like sections 26, 28, the sections 26 being supportably engaged at their upper ends by the underside of the cross member 18 and being provided with inwardly extending gussets 29 which, in turn, are equipped at their upper edges with angulated flanges 30, as is best shown in Figure 6. The lower end portions of the sections 28 of the supports 24 are provided with suitable stub shafts 32 carrying rubber-tired travelling wheels 34, and, as will be noted in Figure 6, suitable bolts 36, selectively receivable in the apertures 22, are employed for securing the flanges 30 of the gussets 29 to the cross member 18, the rows of apertures 22 facilitating an adjustment whereby the tread or distance between the wheels 34 may be varied as desired.

Moreover, diagonally extending struts 38 are welded or otherwise secured at one end thereof to the support sections 26 (see Figures 1 and 3), the remaining ends of these struts being adjustably secured to the cross member 16 by suitable bolts 40 which are selectively receivable in the aforementioned apertures 20. That is to say, when the adjustment of the wheel tread is to be made, bolts 36 as well as the bolts 40 are removed and placed in the appropriate apertures 22, 20, respectively, as will be clearly understood.

Th wheel supports 24 are longitudinally adjustable by virtue of their slidably telescoped sections 26, 28, these sections being adjustably secured together by pairs of transversely extending bolts 42, 44 receivable in suitable apertures 46 with which the sections 26, 28 are provided. Accordingly, by simply removing the bolts 42, 44 and sliding the support sections 28 upwardly or downwardly with respect to the support sections 26, the height of the frame 14, and, consequently, of the tank 12, above the ground may be varied as desired.

It may be explained at this point that the tank 12 is retained in position on the frame 14 in any suitable manner, such as, for example, by straps extending circumferentially around the tank and secured to the framework, or the like. This fastening means for the tank is of a conventional nature, and is not illustrated in the accompanying drawings.

The carrier is provided at the front end thereof with a forwardly and downwardly extending draw-bar 48, this including a pair of slidably telescoped sections 50, 52, the latter of which is provided with a suitable coupling yoke or hitch 54. The telescoped portions of the sections 50, 52 of the draw-bar 48 are formed with apertures to receive suitable bolts 56 whereby the two sections are adjustably secured together, this permitting adjustment of the draw-bar with respect to the hitch of the tractor (not shown) or the like, by which the carrier is drawn, in accordance with variations in the height of the frame 14 above the ground, as facilitated by the adjustable sections 26, 28 of the wheel supports 24. In other words, if the height of the frame 14 above the ground is increased, the length of the draw-bar 48 may be increased accordingly, and vice versa, so that the yoke 54 is at proper level with respect to the tractor hitch, as will be clearly understood.

If desired, suitable tie rods 58 may extend between the sections 52 of the draw-bar 48 and the frame 14 for the purpose of reinforcing the draw-bar, the tie-rods 58 either being longitudinally adjustable, or alternatively, tie rods of different lengths being employed, so as to suit the longitudinal adjustment of the draw-bar.

Referring now to the accompanying Figures 7, 8 and 9, these illustrate a modified embodiment of the invention designated generally by the reference character 60. This embodiment is primarily intended for carrying a plurality of tanks, but the structural features thereof are such as to permit it to be "contracted" so to speak, to accommodate only one tank, when so desired.

The embodiment 60 includes in its construction a frame 62 comprising a pair of spaced parallel cross members 64 and a plurality of longitudinal members 66, 68.

Each of the cross members 64 consists of a tubular intermediate section 70 and a pair of lateral sections 72 which are slidably telescoped in the intermediate section, so that the overall length of the cross members may be increased or decreased as desired.

The aforementioned longitudinal members 66 rigidly connect together the intermediate sections 70 of the cross members 64, while the aforementioned members 68 rigidly connect together the outer ends of the cross member sections 72, as is best shown in Figures 7 and 9. In this manner, the two cross members 64 are rigidly connected together and maintained in a predetermined spaced relation, but, nevertheless, their overall length may be increased or decreased, as has been already described.

The cross members 64 coact with the members 66, 68 in forming a plurality of cradles 74 for the reception of a plurality of tanks indicated at 76, when the cross members 64 are extended, as shown in the accompanying drawings. However, when it is desired to carry only one tank, the cross members may be "contracted" or shortened so that the members 68 abut the ends of the member sections 70 and only one tank carrying cradle remains, being defined by the member sections 70 and the members 66. Suitable locking bolts or pins 76 are provided for retaining the cross members 64 either in an extended or in a foreshortened position, and it will be also noted that one of the cross members 64 is equipped with a draw-bar 78, similar to the aforementioned draw-bar 48.

The longitudinal members 68 of the frame 62 are equipped with downwardly extending supports 80, reinforced as at 82 and provided with the travelling wheels 84. Inasmuch as the supports 80 are thus provided on the members 68, the wheel "tread" is automatically increased and decreased by lengthening and shortening the cross members 64, so that the width of the carrier may be substantially reduced when only one tank is being carried thereon.

If desired, the supports 80 may be adjustable as to height by means similar to those disclosed in association with the aforementioned supports 24.

It is believed that the advantages and use of the invention will be clearly apparent from the foregoing disclosure, and, accordingly, further description thereof at this point is deemed unnecessary.

While in the foregoing there has been shown and described the preferred embodiment of this invention, it is to be understood that minor changes in the details of construction, combination and arrangement of parts may be resorted to without departing from the spirit and scope of the invention as claimed.

Having described the invention, what is claimed as new is:

In a vertically adjustable trailer, the combination of a horizontal frame including a cross-member disposed intermediate the front and rear ends of the frame, a pair of transversely spaced vertical wheel supports including tubular upper sections secured to and depending from opposite end portions of said cross-member and tubular lower sections slidably telescoped in and extending downwardly from the respective upper sections, traveling wheels mounted at lower ends of said wheel supports, means for locking the lower sections against upward sliding in the upper sections whereby the frame may be adjustably sustained at a predetermined level above ground, and a draw bar extending forwardly and downwardly from the front end of said frame and including a tubular upper section secured to the frame, a tubular lower section slidably telescoped in the last mentioned upper section, a hitch at the lower end of said draw bar, and means for locking the upper and lower sections of the draw bar against relative sliding, whereby said hitch may be adjustably sustained at a predetermined level above ground regardless of the adjustment of said wheel supports.

JOHN E. RISSE.

REFERENCES CITED

The following references are of record in the file of this patent:

UNITED STATES PATENTS

| Number | Name | Date |
| --- | --- | --- |
| 1,710,122 | Sorenson | Apr. 23, 1929 |
| 2,174,415 | Curtis | Sept. 26, 1939 |
| 2,248,080 | Hathaway | July 8, 1941 |